(12) United States Patent
Watanabe

(10) Patent No.: US 9,407,667 B2
(45) Date of Patent: Aug. 2, 2016

(54) COMMUNICATION DEVICE, ROUTER, COMMUNICATION SYSTEM, AND CONTROLLING METHODS FOR COMMUNICATION DEVICE AND ROUTER

(75) Inventor: Makoto Watanabe, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 0 days.

(21) Appl. No.: 14/130,981

(22) PCT Filed: Mar. 16, 2012

(86) PCT No.: PCT/JP2012/001873
§ 371 (c)(1),
(2), (4) Date: Jan. 6, 2014

(87) PCT Pub. No.: WO2013/008364
PCT Pub. Date: Jan. 17, 2013

(65) Prior Publication Data
US 2014/0126579 A1 May 8, 2014

(30) Foreign Application Priority Data
Jul. 14, 2011 (JP) .................................. 2011-155914

(51) Int. Cl.
*H04L 12/56* (2006.01)
*H04L 29/06* (2006.01)
*H04L 29/12* (2006.01)

(52) U.S. Cl.
CPC ........ *H04L 65/1006* (2013.01); *H04L 61/2015* (2013.01); *H04L 65/105* (2013.01); *H04L 65/1016* (2013.01); *H04L 65/1036* (2013.01); *H04L 65/1046* (2013.01); *H04L 65/1069* (2013.01); *H04L 65/1073* (2013.01); *H04L 65/1026* (2013.01)

(58) Field of Classification Search
None
See application file for complete search history.

(56) References Cited

U.S. PATENT DOCUMENTS

| | | | |
|---|---|---|---|
| 2004/0196821 A1 | 10/2004 | Haddad et al. | |
| 2006/0067332 A1* | 3/2006 | Wen | H04L 43/50 370/395.52 |
| 2006/0271664 A1 | 11/2006 | Ono et al. | |
| 2009/0296566 A1* | 12/2009 | Yasrebl et al. | 370/221 |
| 2009/0307307 A1* | 12/2009 | Igarashi | 709/203 |
| 2010/0280961 A1* | 11/2010 | Thyni | G06Q 50/188 705/80 |

(Continued)

FOREIGN PATENT DOCUMENTS

| | | |
|---|---|---|
| CN | 1937632 A | 3/2007 |
| EP | 1841173 A2 | 10/2007 |

(Continued)

OTHER PUBLICATIONS

Goro Inomae et al. "A Study of IP Telephone Architecture Using UPnP in Home Network", FIT2008 Forum on Information Technology 2008, Aug. 20, 2008, pp. 249-250.

(Continued)

*Primary Examiner* — Jutai Kao
(74) *Attorney, Agent, or Firm* — Sughrue Mion, PLLC

(57) ABSTRACT

In order to facilitate connecting to a SIP network, a router (20) forming a communication system (1) acquires information from a carrier network (30) by using DHCP. The information is necessary for connecting to a server (SIP server) placed on the carrier network. Moreover, a communication device (10) acquires the information from the router (20) by using local protocol that differs from the SIP and the DHCP. For example, UPnP protocol is adopted as the local protocol.

13 Claims, 11 Drawing Sheets

(56) References Cited

U.S. PATENT DOCUMENTS

| | | | |
|---|---|---|---|
| 2010/0302995 A1* | 12/2010 | Morioka | 370/315 |
| 2011/0019660 A1* | 1/2011 | Kumarasamy | H04L 65/1059 370/352 |
| 2011/0246624 A1* | 10/2011 | Kato | H04L 65/1016 709/219 |
| 2012/0106542 A1* | 5/2012 | Inoue | H04L 41/0806 370/352 |

FOREIGN PATENT DOCUMENTS

| | | |
|---|---|---|
| JP | 2006-042176 A | 2/2006 |
| JP | 2010-268356 A | 11/2010 |
| WO | 2012005129 A1 | 1/2012 |

OTHER PUBLICATIONS

International Search Report of PCT/JP2012/001873 dated Apr. 17, 2012.

Communication dated Aug. 11, 2014 from the State Intellectual Property Office of the People's Republic of China in counterpart application No. 201280033839.4.

Extended European Search Report issued Dec. 2, 2014, in application No. EP 12811098.

* cited by examiner

```
100
M_SEARCH * HTTP/1.1
MX:3
HOST:239.255.255.250:1900
MAN:"ssdp:discover"
ST:urn:schemas-upnp-org:service:SIPConnection:1    101
```

HTTP/1.1 200 OK
ST:urn:schemas-upnp-org:service:SIPConnection:1    201
 . .
LOCATION:http://172.16.0.254:2869/rootDesc.xml    202
CACHE-CONTROL:max-age=1800
 . .
```

Fig. 6

```
GET /rootDesc.xml HTTP/1.1
HOST:172.16.0.254:2869;  ←—301
ACCEPT-LANGUAGE:en
```

```
HTTP/1.1 200 OK
DATE:2010/07/26 06:30:53
CONTENT-LANGUAGE:en
CONTENT-TYPE:text/xml
CONTENT-LENGTH:1416

<?xml version="1.0"?>
<root xmlns="urn:schemas-upnp-org:device-1-0">
<specVersion>
<major>1</major>
<minor>0</minor>
</specVersion>
<device>
   .
   .
<serviceList>
 <service>
   <serviceType>urn:schemas-upnp-org:service:SIPConnection:1</serviceType>
   <serviceId>urn:upnp-org:serviceId:SIPConn1</serviceId>
   <SCPDURL>/NOFILE.xml</SCPDURL>
   <controlURL>/SIPConnection</controlURL>
   <eventSubURL>/SIPConnection</eventSubURL>
 </service>
</serviceList>
<deviceList>
 <device>
    .
    .
   <serviceList>                                                      401
    <service>
     <serviceType>urn:xxx:service:SIPAccount:1</serviceType>
     <serviceId>urn:yyy:serviceId:SIPAccount1</serviceId>
     <SCPDURL>/NOFILE.xml</SCPDURL>
     <controlURL>/SIPAccount</controlURL>
    </service>
   </serviceList>
                                        402
 </device>
</deviceList>
</device>
</root>
```

Fig. 8

```
POST /SIPAccount HTTP/1.1
HOST:172.16.0.254:28691          502
SOAPACTION:"urn:xxx:service:SIPAccount:1#GetSIPAccount"
CONTENT-LENGTH:330
CONTENT-TYPE:text/xml <?xml version="1.0"?>
<SOAP-ENV:Envelope xmlns:SOAP-ENV="http://schemas.xmlsoap.org/soap/envelope/"
SOAP-ENV:encodingStyle="http://schemas.xmlsoap.org/soap/encoding">
<SOAP-ENV:Body>
<m:GetSIPAccount xmlns:m="urn:xxx:service:SIPAccount:1"></m:GetSIPAccount>
</SOAP-ENV:Body>
</SOAP-ENV:Envelope>
```

```
HTTP/1.1 200 OK
DATE:2010/07/26 06:30:54
CONTENT-TYPE:text/xml
CONTENT-LENGTH:433
 .
 .
EXT:

<?xml version="1.0"?>
<s:Envelope xmlns:s="http://schemas.xmlsoap.org/soap/envelope/"
s:encodingStyle="http://schemas.xmlsoap.org/soap/encoding">
<s:Body>
<u:GetSIPAccountResponse xmlns:u="urn:xxx:service:SIPAccount:1">
 .
 .
<SipServerIPAddress xmlns:dt="urn:xxx:datatypes" dt:dt="string">10.112.40.10</SipServerIPAddress>  601
 .
<BaseTelNumber xmlns:dt="urn:xxx:datatypes" dt:dt="string">0312341111</BaseTelNumber>  602
 .
<SipDomainName xmlns:dt="urn:xxx:datatypes" dt:dt="string">sip.ngn.co.jp</SipDomainName>  603
</u:GetSIPAccountResponse>
</s:Body>
</s:Envelope>
```

| INFORMATION ELEMENT | VALUE |
|---|---|
| SIP SERVER IP ADDRESS | 10.112.40.10 |
| USER ID | 031234111 |
| SIP DOMAIN NAME | sip.ngn.co.jp |

COMMUNICATION DEVICE, ROUTER, COMMUNICATION SYSTEM, AND CONTROLLING METHODS FOR COMMUNICATION DEVICE AND ROUTER

CROSS REFERENCE TO RELATED APPLICATIONS

This is a National Stage of International Application No. PCT/JP2012/001873 filed Mar. 16, 2012, claiming priority based on Japanese Patent Application No. 2011-155914 filed Jul. 14, 2011, the contents of all of which are incorporated herein by reference in their entirety.

TECHNICAL FIELD

The present invention relates to a communication device, a router, a communication system, and controlling methods for the communication device and the router. In particular, the present invention relates to a technique to acquire information necessary for connecting to a SIP (Session Initiate Protocol) network (hereinafter, this information will be sometimes referred to as SIP information).

BACKGROUND ART

Recently, NGN (Next Generation Network) has become mainstream in respective carriers. In a communication system compatible with the NGN, a communication device is often required for acquiring, by use of DHCP (Dynamic Host Configuration Protocol), SIP information such as a user ID (Identifier) and an IP (Internet Protocol) address from a SIP network at the carrier side, and for automatically executing registration processing to the SIP network.

Note that as an example of such a communication system, there has been known an IP telephone system disclosed by PTL 1.

CITATION LIST

Patent Literature

PTL 1: Japanese Unexamined Patent Application Publication No. 2006-42176

SUMMARY OF INVENTION

Technical Problem

However, the inventor of this application has found that there is a problem that it is difficult for the above-mentioned communication system to be introduced. Specifically, for connecting to the SIP network, it is necessary to install a DHCP client function in a communication device which does not have the DHCP client function installed at the side of the communication system. Further, broadcasting is used in the DHCP. Therefore, in a case where the communication system is composed of multistage networks, there are also caused security problems, such as port settings are configured for broadcasting. Furthermore, in a case where the DHCP client function is not installed, a user needs to manually configure cumbersome settings for each communication device.

The present invention has been accomplished in view of the above-mentioned problems, and an exemplary object of the present invention is to facilitate connecting to a SIP network.

Solution to Problem

In order to achieve the above-mentioned object, a communication device according to a first exemplary aspect of the present invention includes: call control means for performing call control in compliance with SIP (Session Initiate Protocol) upon communicating with a server placed on a carrier network; and first interface means for connecting to a router that relays traffic between the communication device and the carrier network. The call control means is configured to acquire information from the router through the first interface means by using local protocol, the information being necessary for connecting to the server and preliminarily acquired by the router using DHCP (Dynamic Host Configuration Protocol), the local protocol differing from the SIP and the DHCP.

Further, a router according to a second exemplary aspect of the present invention includes: first interface means for connecting to a communication device; second interface means for connecting to a carrier network; and relay means for relaying, through the first and second interface means, traffic between the communication device and the carrier network. The relay means is configured to: acquire information from the carrier network through the second interface means by using DHCP, the information being necessary for connecting to a server that can communicate with the communication device in compliance with SIP; and notify the information to the communication through the first interface means by using local protocol that differs from the SIP and the DHCP.

Further, a communication system according to a third exemplary aspect of the present invention includes: a communication device that communicates with a server placed on a carrier network in compliance with SIP; and a router that relays traffic between the communication device and the carrier network. The router acquires information from the carrier network by using DHCP, the information being necessary for connecting to the server. The communication device acquires the information from the router by using local protocol that differs from the SIP and the DHCP.

Further, a controlling method according to a fourth exemplary aspect of the present invention provides a method of controlling a communication device that communicates with a server placed on a carrier network in compliance with SIP. This method includes: acquiring information from a router by using local protocol, the router relaying traffic between the communication device and the carrier network, the information being necessary for connecting to the server and preliminarily acquired by the router using DHCP, the local protocol differing from the SIP and the DHCP; and using the information for call control upon communicating with the server.

Furthermore, a controlling method according to a fifth exemplary aspect of the present invention provides a method of controlling a router that relays traffic between a communication device and a carrier network. This method includes: acquiring information from the carrier network by using DHCP, the information being necessary for connecting to a server that can communicate with the communication device in compliance with SIP; and notifying the information to the communication device by using local protocol that differs from the SIP and the DHCP.

Advantageous Effects of Invention

According to the present invention, it is possible to facilitate connecting to a SIP network.

BRIEF DESCRIPTION OF DRAWINGS

FIG. 5 is a diagram showing a first example of messages transmitted from the communication device to the router in the communication system according to the exemplary embodiment of the present invention;

FIG. 6 is a diagram showing a first example of messages transmitted from the router to the communication device in the communication system according to the exemplary embodiment of the present invention;

FIG. 7 is a diagram showing a second example of messages transmitted from the communication device to the router in the communication system according to the exemplary embodiment of the present invention;

FIG. 8 is a diagram showing a second example of messages transmitted from the router to the communication device in the communication system according to the exemplary embodiment of the present invention;

FIG. 9 is a diagram showing a third example of messages transmitted from the communication device to the router in the communication system according to the exemplary embodiment of the present invention;

FIG. 10 is a diagram showing a third example of messages transmitted from the router to the communication device in the communication system according to the exemplary embodiment of the present invention; and FIG. 11 is a diagram showing a configuration example of SIP information acquired by the communication device according to the exemplary embodiment of the present invention.

DESCRIPTION OF EMBODIMENTS

Figure 1:
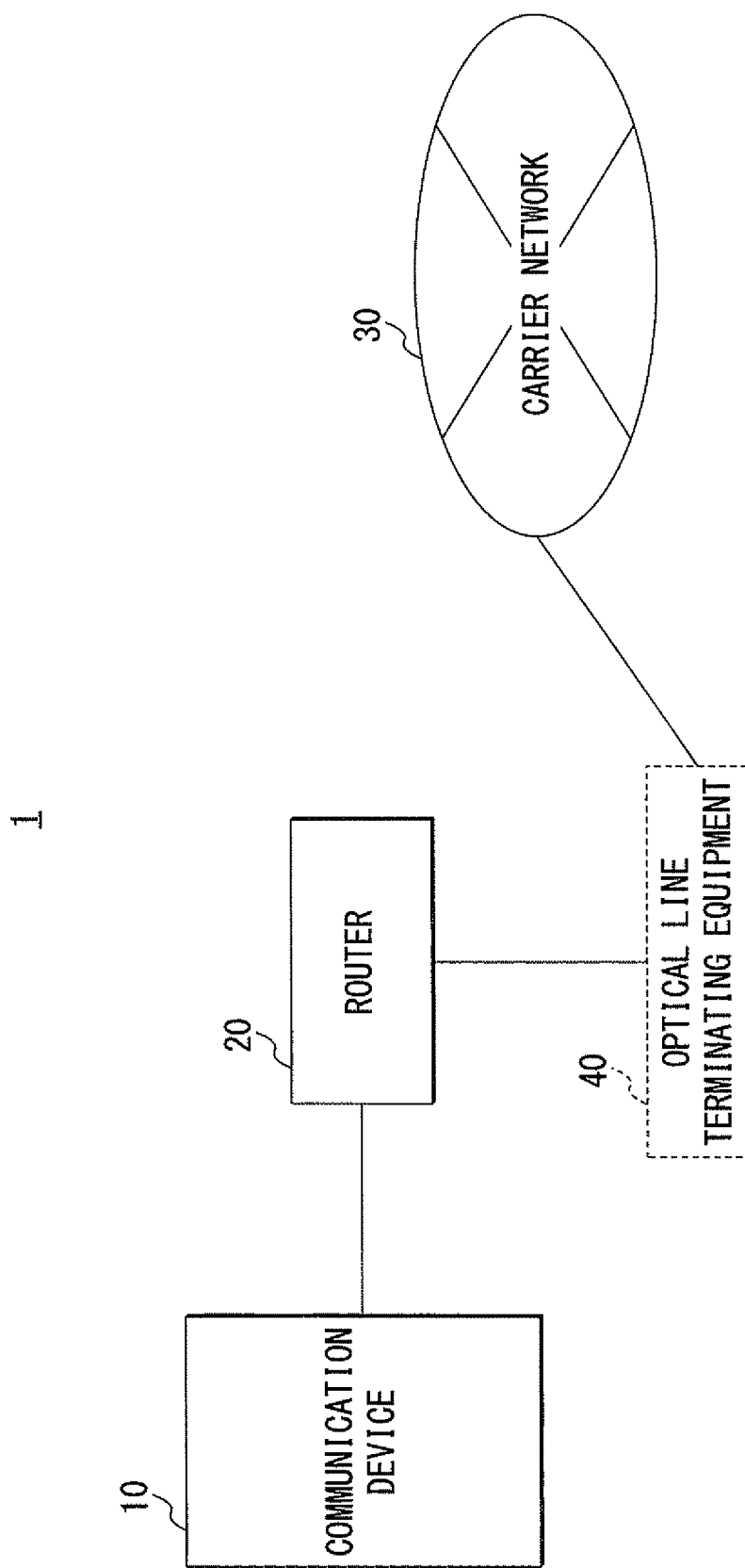
FIG. 1 is a block diagram showing a configuration example of a communication system according to an exemplary embodiment of the present invention.

Hereinafter, an exemplary embodiment of a communication device and a router according to the present invention, and a communication system to which these communication device and router are applied, will be described with reference to FIGS. 1 to 11. Note that in the drawings, identical reference symbols denote identical elements and redundant explanation thereof will be omitted as appropriate to clarify the explanation.

As shown in FIG. 1, a communication system 1 according to this exemplary embodiment includes a communication device 10 and a router 20. The communication device 10 communicates, in compliance with SIP, with a server (not shown) placed on a carrier network 30 serving as NGN. The router 20 relays traffic between the communication device 10 and the carrier network 20. For example, the router 20 is connected to the carrier network 30 through an optical line terminating equipment 40 shown by dotted lines in FIG. 1. Note that the above-mentioned server is an element of a SIP network, and is a server (so-called SIP server) which performs various kinds of call control in compliance with the SIP.

In operations, the router 20 firstly acquires SIP information from the carrier network 30 by using DHCP, and holds the acquired SIP information. The SIP information includes an IP address of the SIP server, a user ID and a SIP domain name.

On the other hand, the communication device 10 acquires the SIP information from the router 20 by using local protocol which differs from the SIP and the DHCP.

In this way, in this exemplary embodiment, the communication device 10 autonomously acquires the SIP information by conducting local communication with the router 20. Therefore, this exemplary embodiment makes it easy to connect to the SIP network, compared with the conventional communication system. More particularly, it is not necessary to install the DHCP client function in the communication device, there are not also caused security problems, such as port settings to the router are configured for broadcasting. Moreover, the minimum initial settings only have to be configured for the router, and also a user does not need to manually configure settings for the communication device.

In addition, it is preferable that UPnP (Universal Plug and Play) protocol be used as the above-mentioned local protocol. This is because in a typical communication device and router, the UPnP protocol is adopted for the purpose of acquiring an IP address at the WAN (Wide Area Network) side of the router. In the case of using the UPnP protocol, the communication device 10 and the router 20 according to this exemplary embodiment can be configured by expanding the existing interface, so that it is also possible to achieve the advantageous effect that the cost of development can be reduced. Meanwhile, it is not essential to use the UPnP protocol, and another protocol other than the SIP and the DHCP may be used. For example, the local communication between the communication device 10 and the router 20 may be conducted in compliance with TCP (Transmission Control Protocol), or MAC (Media Access Control) protocol. In such a case, the SIP information can also be autonomously acquired, so that it is possible to achieve the advantageous effect of facilitating the connecting to the SIP network, similarly.

Hereinafter, a specific configuration example and operation example of the communication device 10 and the router 20 realizing the above-mentioned operations will be described in detail with reference to FIGS. 2 to 11.

Figure 2:
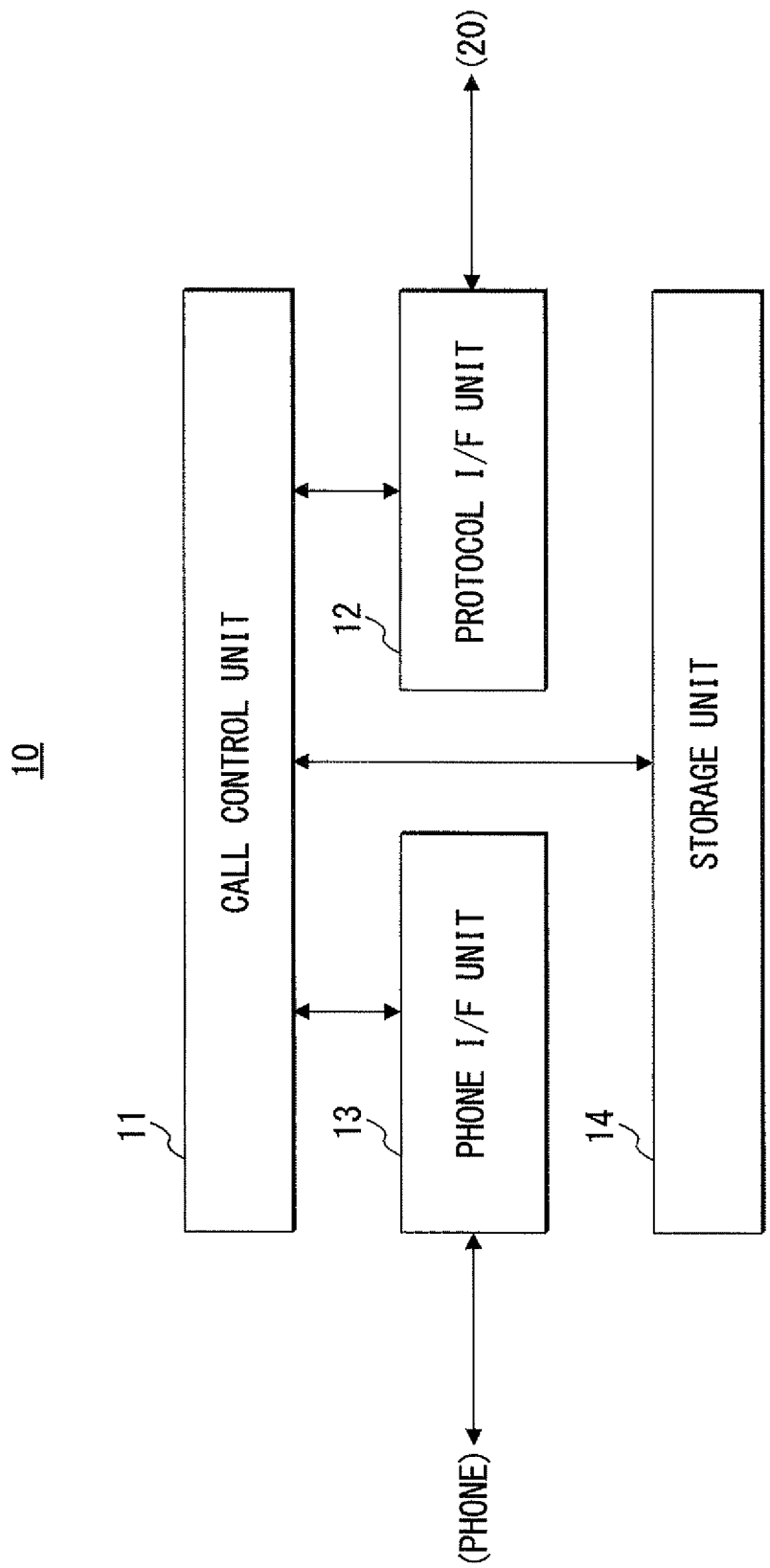
FIG. 2 is a block diagram showing a configuration example of a communication device according to the exemplary embodiment of the present invention.

As shown in FIG. 2, the communication device 10 includes a call control unit 11, a protocol I/F unit 12, phone I/F unit 13, and a storage unit 14.

The call control unit 11 typically performs various kinds of call control upon communicating with the SIP server. Moreover, the protocol I/F unit 12 functions as an interface for connecting the communication device 10 to the router 20. The call control unit 11 acquires, by using the UPnP protocol, the SIP information from the router 20 through the protocol I/F unit 12. In other words, messages in XML (Extensible Markup Language) format in compliance with the UPnP protocol (hereinafter, these messages will be sometimes referred to as UPnP messages) are transmitted between the communication device 10 and the router 20. Further, the call control unit 11 stores the acquired SIP information in the storage unit 14. Furthermore, the call control unit 11 refers to the SIP information in the storage unit 14 to communicate with the SIP server through the protocol I/F unit 12 and the router 20. In other words, messages in compliance with the SIP (hereinafter, these messages will be sometimes referred to as SIP messages) are transmitted between the communication device 10 and the SIP server.

Moreover, the phone I/F unit 13 is an interface for connecting one or more phones to the communication device 10. The call control unit 11 connects a call between the SIP server and each phone through the protocol I/F unit 12 and the phone I/F unit 13, thereby causing the communication device 10 to operate as a switching equipment. Meanwhile, the phone I/F unit 13 is not an essential element, and thus the installation thereof may be omitted. In this case, the communication device 10 can independently operate as a SIP-compatible phone.

Figure 3:
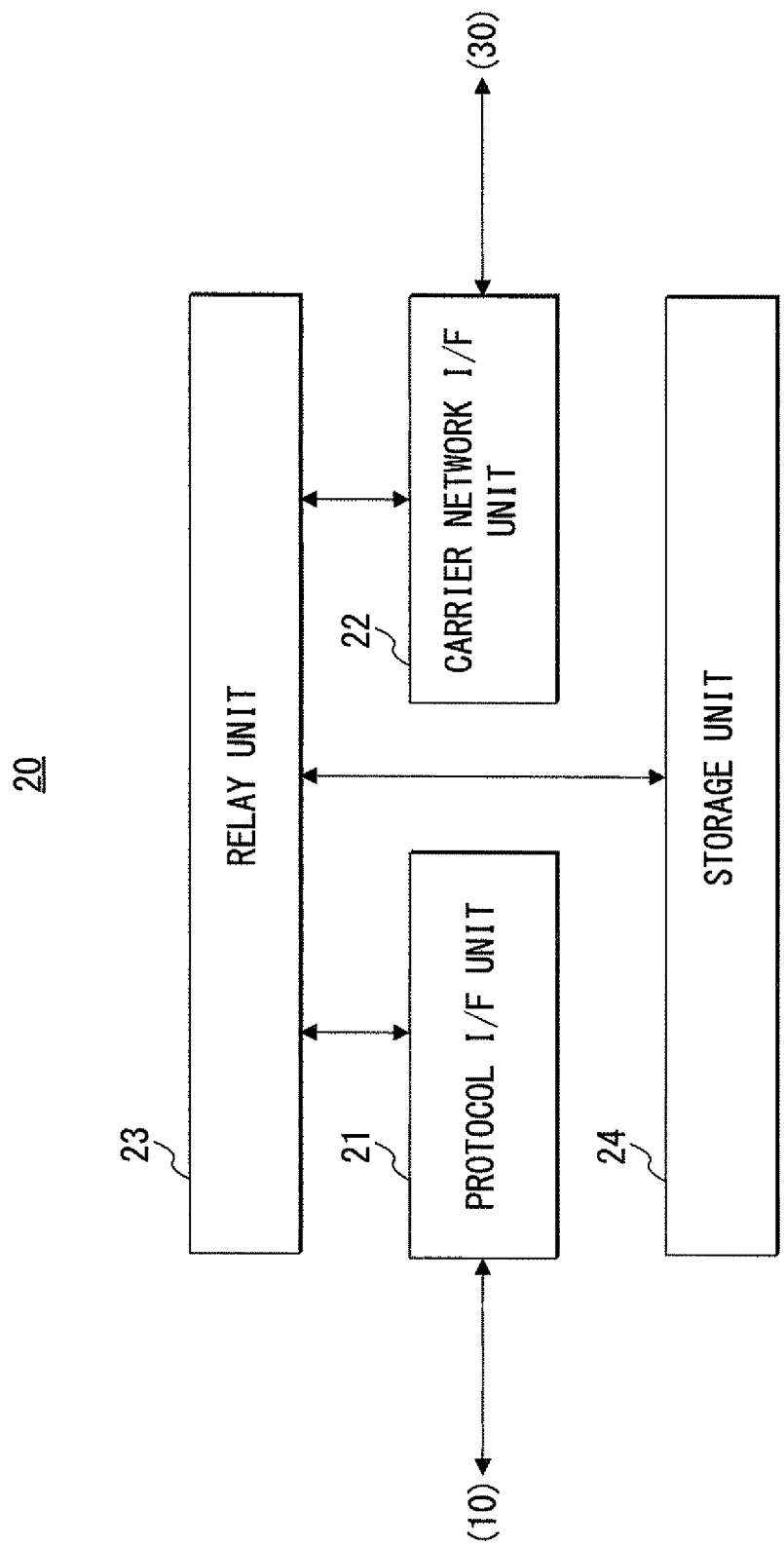
FIG. 3 is a block diagram showing a configuration example of a router according to the exemplary embodiment of the present invention.

On the other hand, as shown in FIG. 3, the router 20 includes a protocol I/F 21, a carrier network I/F unit 22, a relay unit 23, and a storage unit 24.

The protocol I/F unit 21 functions as an interface for connecting the communication device 10 to the router 20. Moreover, the carrier network I/F unit 22 functions as an interface for connecting the router 20 to the carrier network 30.

The relay unit 23 typically relays SIP messages between the communication device 10 and the carrier network 30 through the protocol I/F unit 21 and the carrier network I/F unit 22. Further, the relay unit 23 acquires, by using the DHCP, the SIP information from the carrier network 30 through the carrier network I/F unit 22, and stores the acquired SIP information in the storage unit 24. Furthermore, the relay unit 23 notifies as a SIP message the SIP information in the storage unit 24 to the communication device 10 through the protocol I/F unit 21.

Next, operation examples of the communication device 10 and the router 20 will be described with reference to FIGS. 4 to 11.

Figure 4:
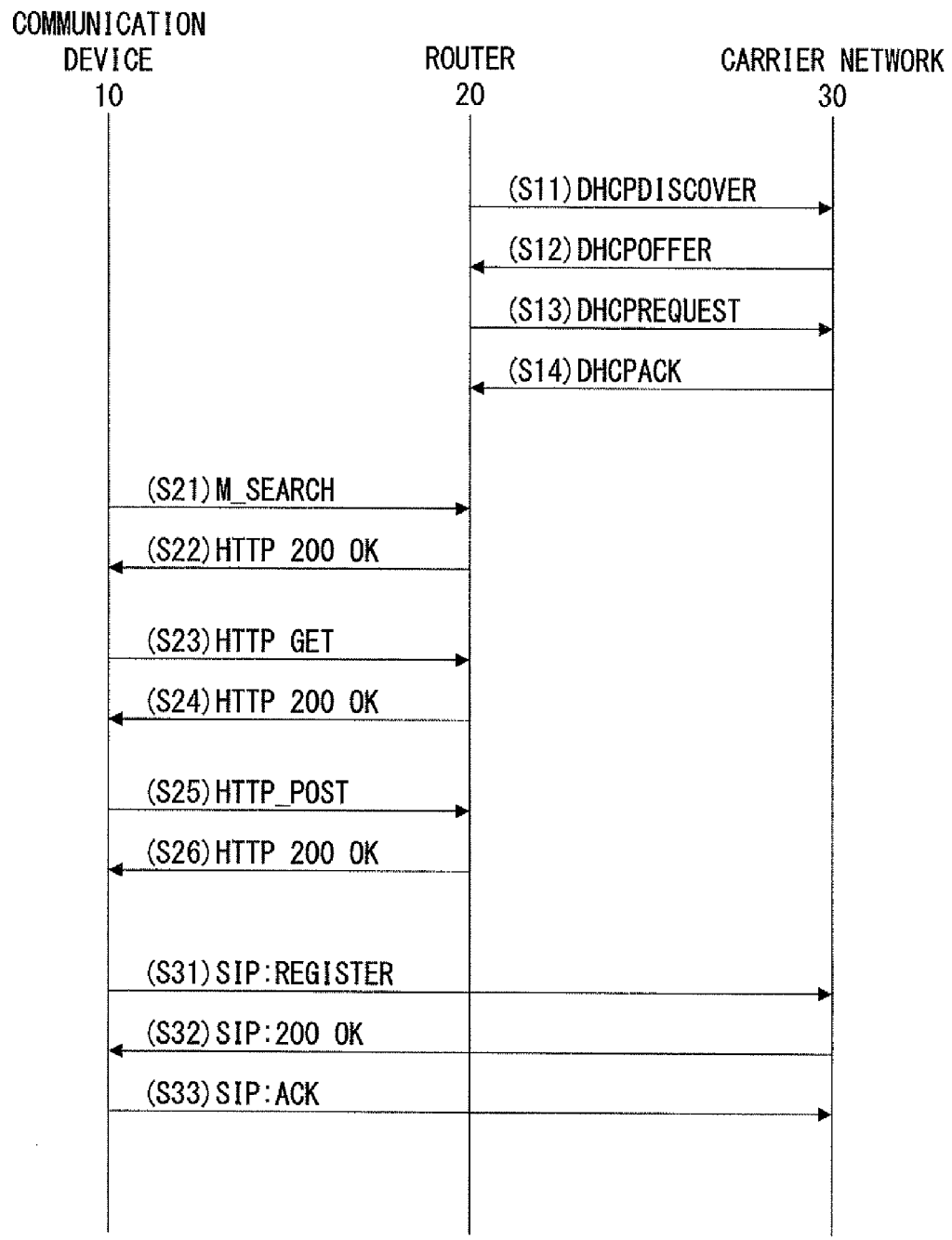
FIG. 4 is a sequence diagram showing an operation example of the communication system according to the exemplary embodiment of the present invention.

As shown in FIG. 4, the router 20 firstly transmits and receives messages in compliance with the DHCP to and from the carrier network 30, thereby preliminarily acquiring the SIP information.

Specifically, the router 20 broadcasts a DHCPDISCOVER message (step S11). The DHCPDISCOVER message is a message for searching a DHCP server which can assign an IP address to the router 20.

The carrier network 30 receives the DHCPDISCOVER message and then transmits to the router 20 a DHCPOFFER message as a response to the DHCPDISCOVER message, thereby giving notification about an IP address at the WAN side, which is assigned to the router 20 (step S12).

The router 20 receives the DHCPOFFER message and then transmits a DHCPREQUEST message to the carrier network 30, thereby requesting to get the IP address notified at above-mentioned step S12 (step S13).

The carrier network 30 receives the DHCPREQUEST message and then transmits to the router 20 a DHCPACK message as a response to the DHCPREQUEST message (step S14). The DHCPACK message includes the SIP information. The router 20 holds the received SIP information.

Next, the communication device 10 transmits and receives UPnP messages to and from the router 20, thereby acquiring the SIP information.

Specifically, the communication device 10 transmits to the router 20 an M_SEARCH message which is one of the UPnP messages (step S21).

As shown in FIG. 5, this M_SEARCH message 100 is a message represented in XML format for searching an UPnP-compatible device, in which a broadcast address "239.255.255.250:1900" is set. Moreover, as denoted by symbol 101 in the messages 100, an element "SIPConnection:1" is set in order to search a device which can provide services for connecting to the SIP network.

The router 20 receives the message 100 and then transmits to the communication device 10 an HTTP 200 OK message as a response to the message 100 (step S22).

As shown in FIG. 6, this HTTP 200 OK message 200 is represented in XML format. As denoted by symbol 201, the element "SIPConnection:1" is set in the message 200, so that the communication device 10 is notified that the router 20 supports the services for connecting to the SIP network. Moreover, in the LOCATION row within the message 200, an IP address "172.16.0.254" and a port number "2869" are set as a transmission destination of an HTTP GET message for acquiring information (rootDesc.xml) held by the router 20.

The communication device 10 receives the message 200 and then transmits the HTTP GET message to the router 20, thereby requesting to get the information (rootDesc.xml) held by the router 20 (step S23).

As shown in FIG. 7, this HTTP GET message 300 is represented in XML format. As denoted by symbol 301 in the HOST row within the message 300, the transmission destination IP address and port number designated by the above-mentioned message 200 are set.

The router 20 receives the message 300 and then transmits to the communication device 10 an HTTP 200 OK message as a response to the message 300 (step S24).

As shown in FIG. 8, this HTTP 200 OK message 400 is represented in XML format. As denoted by symbol 401, an element "SIPAccount:1" is set in the element content corresponding to a service tag within the message 400 (in the portion surrounded by a start tag <service> and an end tag </service>), so that the communication device 10 is notified that the router 20 supports services for transferring the SIP information. Moreover, in the element content corresponding to a ControlURL tag, a value "/SIPAccount" is set which should be described in an HTTP_POST message for requesting the transfer of the SIP information. Note that information specific to the router 20 and the like are also set as other pieces of information in the message 400, although the illustration thereof is omitted.

The communication device 10 receives the message 400 and then transmits the HTTP_POST message to the router 20, thereby requesting the router 20 to transfer the SIP information (step S25).

As shown in FIG. 9, this HTTP_POST message 500 is represented in XML format. As denoted by symbol 501 in the POST row within the message 500, the value designated by the above-mentioned message 400 is set. Further, as denoted by symbol 502 in the HOST row, the transmission destination IP address and port number designated by the above-mentioned message 200 are set. Further, as denoted by symbol 503, an element "urn:xxx:service:SIPAccount:1#GetSIPAccount" is set in the SOAPACTION row. Furthermore, as denoted by symbol 504 as the element content corresponding to a SOAP-ENV:Body tag, an empty element tag <m:GetSIPAccount xmlns:m="urn:xxx:service:SIPAccount:1"> </m:GetSIPAccount> is set.

The router 20 receives the message 500 and then transmits to the communication device 10 an HTTP 200 OK message as a response to the message 500 (step S26).

As shown in FIG. 10, this HTTP 200 OK message 600 is represented in XML format. As denoted by symbol 601, an IP address "10.112.40.10" of the SIP server is set in the element content corresponding to a SipServerIPAddress tag within the message 600. Further, as denoted by symbol 602, a user ID "031231111" is set in the element content corresponding to a BaseTelNumber tag. Furthermore, as denoted by symbol 603, a SIP domain name "sip.ngn.co.jp" is set in the element content corresponding to a SipDomainName tag.

As shown in FIG. 11, the communication device 100 receives the message 600, and then stores as SIP information 700 the designated IP address, user ID and SIP domain name in association with each other.

After that, the communication 100 refers to the stored SIP information 700 to execute registration processing to the SIP network.

Specifically, the communication device 100 transmits a REGISTER message, which is one of the SIP messages, to the SIP server on the carrier network 30 through the router 20 (step S31). The SIP server receives the REGISTER message, and then transmits a 200 OK message to the communication device 10 (step S32). The communication device 10 receives the 200 OK message, and then transmits an ACK message to the SIP server (step S33).

Thus, the communication device 10 is registered as a user agent to the SIP network.

Note that the present invention is not limited to the above-described exemplary embodiments, and it will be understood by those of ordinary skill in the art that various changes in form and details may be made therein without departing from the spirit and scope of the present invention as defined by the claims.

This application is based upon and claims the benefit of priority from Japanese patent application No. 2011-155914, filed on Jul. 14, 2011, the disclosure of which is incorporated herein in its entirety by reference.

INDUSTRIAL APPLICABILITY

The present invention is applied to a communication device, a router, a communication system, and controlling methods for the communication device and the router. In particular, the present invention is applied for the purpose of acquiring information necessary for connecting to a SIP.

The whole or part of the exemplary embodiments disclosed above can be described as, but not limited to, the following supplementary notes.

(Supplementary Note 1)

A communication device comprising:

call control means for performing call control in compliance with SIP (Session Initiate Protocol) upon communicating with a server placed on a carrier network; and first interface means for connecting to a router that relays traffic between the communication device and the carrier network, wherein the call control means is configured to acquire information from the router through the first interface means by using local protocol, the information being necessary for connecting to the server and preliminarily acquired by the router using DHCP (Dynamic Host Configuration Protocol), the local protocol differing from the SIP and the DHCP.

(Supplementary Note 2)

The communication device according to Supplementary note 1, wherein the call control means is configured to use UPnP (Universal Plug and Play) protocol as the local protocol.

(Supplementary Note 3)

The communication device according to Supplementary note 1 or 2, further comprising second interface means for connection to a different communication device, wherein the call control means is configured to connect, through the first and second interface means, a call between the server and the different communication device.

(Supplementary Note 4)

A router comprising:

first interface means for connecting to a communication device;

second interface means for connecting to a carrier network; and relay means for relaying, through the first and second interface means, traffic between the communication device and the carrier network, wherein the relay means is configured to:

acquire information from the carrier network through the second interface means by using DHCP, the information being necessary for connecting to a server that can communicate with the communication device in compliance with SIP; and notify the information to the communication through the first interface means by using local protocol that differs from the SIP and the DHCP.

(Supplementary Note 5)

The router according to Supplementary note 4, wherein the relay means is configured to use UPnP protocol as the local protocol.

(Supplementary Note 6)

A communication system comprising:

a communication device that communicates with a server placed on a carrier network in compliance with SIP; and a router that relays traffic between the communication device and the carrier network, wherein the router acquires information from the carrier network by using DHCP, the information being necessary for connecting to the server, wherein the communication device acquires the information from the router by using local protocol that differs from the SIP and the DHCP.

(Supplementary Note 7)

The communication system according to Supplementary note 6, wherein UPnP protocol is adopted as the local protocol.

(Supplementary Note 8)

The communication system according to Supplementary note 6 or 7, wherein the communication device connects call between the server and a different communication device.

(Supplementary Note 9)

A method of controlling a communication device that communicates with a server placed on a carrier network in compliance with SIP, the method comprising:

acquiring information from a router by using local protocol, the router relaying traffic between the communication device and the carrier network, the information being necessary for connecting to the server and preliminarily acquired by the router using DHCP, the local protocol differing from the SIP and the DHCP; and using the information for call control upon communicating with the server.

(Supplementary Note 10)

The method according to Supplementary note 9, including using UPnP protocol as the local protocol.

(Supplementary Note 11)

The method according to Supplementary note 9 or 10, further comprising connecting a call between the server and a different communication device.

(Supplementary Note 12)

A method of controlling a router that relays traffic between a communication device and a carrier network, the method comprising:

acquiring information from the carrier network by using DHCP, the information being necessary for connecting to a server that can communicate with the communication device in compliance with SIP; and notifying the information to the communication device by using local protocol that differs from the SIP and the DHCP.

(Supplementary Note 13)

The method according to Supplementary note 12, including using UPnP protocol as the local protocol.

REFERENCE SIGNS LIST

1 COMMUNICATION SYSTEM
10 COMMUNICATION DEVICE
11 CALL CONTROL UNIT
12, 21 PROTOCOL I/F UNIT
13 PHONE I/F UNIT 14, 24 STORAGE UNIT
20 ROUTER
22 CARRIER I/F UNIT
23 RELAY UNIT
30 CARRIER NETWORK
40 OPTICAL LINE TERMINATING EQUIPMENT
100 M_SEARCH MESSAGE
200, 400, 600 HTTP 200 OK MESSAGE
300 HTTP GET MESSAGE
500 HTTP_POST MESSAGE
700 SIP INFORMATION

The invention claimed is:

1. A communication device comprising:
a call controller configured to perform call control in compliance with SIP (Session Initiate Protocol) upon communicating with a SIP server placed on a carrier network;
a first interface configured to connect to a router that transparently relays traffic between the communication device and the carrier network; and
a second interface configured to connect to a different communication device,
wherein the call controller is further configured to:
acquire information from the router through the first interface unit by using local protocol, the information being necessary for connecting to the SIP server and preliminarily acquired by the router using DHCP (Dynamic Host Configuration Protocol), the local protocol differing from the SIP and the DHCP, and the information including an address of the SIP server; and
connect, through the first and second interface units, a call for the different communication device.

2. The communication device according to claim 1, wherein the call controller is configured to use UPnP (Universal Plug and Play) protocol as the local protocol.

3. The communication device according to claim 1, wherein the call controller is configured to connect, through the first and second interface units, a call between the SIP server and the different communication device.

4. A router comprising:
a first interface configured to connect a communication device;
a second interface configured to connect to a carrier network; and
a relay configured to transparently relay, through the first and second interface, traffic between the communication device and the carrier network,
wherein the relay is further configured to:
acquire information from the carrier network through the second interface unit by using a DHCP (Dynamic Host Configuration Protocol), the information being necessary for connecting to a SIP server that can communicate with the communication device in compliance with a SIP (Session Initiate Protocol), and the information including an address of the SIP server; and
notify the information to the communication device through the first interface unit by using a local protocol that differs from the SIP and the DHCP,
wherein the communication device connects a call for a different communication device.

5. The router according to claim 4, wherein the relay is configured to use an UPnP (Universal Plug and Play) protocol as the local protocol.

6. The router according to claim 4, wherein the relay is further configured to acquire the information from the SIP server.

7. The router according to claim 4, wherein the information comprises SIP information.

8. The router according to claim 7, wherein the SIP information comprises at least one from among an IP (Internet Protocol) address of the SIP server, a user ID (identifier), and an SIP domain name.

9. A communication system comprising:
a communication device that communicates with a SIP server placed on a carrier network in compliance with a SIP (Session Initiate Protocol);
a router that transparently relays traffic between the communication device and the carrier network; and
a different communication device,
wherein the router acquires information from the carrier network by using a DHCP (Dynamic Host Configuration Protocol), the information being necessary for connecting to the SIP server, and the information including an address of the SIP server,
wherein the communication device acquires the information from the router by using a local protocol that differs from the SIP and the DHCP, and
wherein the communication device connects a call for the different communication device.

10. A method of controlling a communication device that communicates with a SIP server placed on a carrier network in compliance with a SIP (Session Initiate Protocol), the method comprising:
acquiring information from a router by using a local protocol, the router transparently relaying traffic between the communication device and the carrier network, the information being necessary for connecting to the SIP server and preliminarily acquired by the router using a DHCP (Dynamic Host Configuration), the local protocol differing from the SIP and the DHCP, and the information including an address of the SIP server;
using the information for call control upon communicating with the SIP server; and
connecting a call for a different communication device.

11. The method according to claim 10, including using an UPnP (Universal Plug and Play) protocol as the local protocol.

12. The method according to claim 10, further comprising connecting a call between the SIP server and the different communication device.

13. A method of controlling a router that transparently relays traffic between a communication device and a carrier network, the method comprising:
acquiring information from the carrier network by using a DHCP (Dynamic Host Configuration Protocol), the information being necessary for connecting to a SIP server that can communicate with the communication device in compliance with a SIP (Session Initiate Protocol), and the information including an address of the SIP server; and
notifying the information to the communication device by using local protocol that differs from the SIP and the DHCP,
wherein the communication device connects a call for a different communication device.

* * * * *